(12) United States Patent
Dahlheimer

(10) Patent No.: US 6,805,357 B2
(45) Date of Patent: Oct. 19, 2004

(54) BELLOWS FACE SEAL ASSEMBLY (75) Inventor: John C. Dahlheimer, Laconia, NH (US)

(73) Assignee: Freudenberg-Nok GP, Plymouth, MI (US)

(*) Notice: Subject to any disclaimer, the term of this patent is extended or adjusted under 35 U.S.C. 154(b) by 2 days.

(21) Appl. No.: 10/150,536

(22) Filed: May 17, 2002

(65) Prior Publication Data

US 2003/0006560 A1 Jan. 9, 2003

Related U.S. Application Data

(60) Provisional application No. 60/292,239, filed on May 18, 2001.

(51) Int. Cl.$^7$ ................................................ F16J 15/34
(52) U.S. Cl. ......................... 277/377; 277/358; 277/370
(58) Field of Search .................................. 277/377, 358, 277/370, 372, 373

(56) References Cited

U.S. PATENT DOCUMENTS

| | | | | |
|---|---|---|---|---|
| 2,586,297 A | * | 2/1952 | Brummer | 277/379 |
| 2,728,591 A | * | 12/1955 | Solari | 277/392 |
| 3,117,793 A | * | 1/1964 | Hauser | 277/372 |
| 3,480,285 A | * | 11/1969 | Anderson | 277/391 |
| 3,536,333 A | * | 10/1970 | Gits | 277/372 |
| 3,914,072 A | * | 10/1975 | Rowley et al. | 417/423.11 |
| 4,278,218 A | * | 7/1981 | Uhrner | 277/393 |
| 4,415,167 A | * | 11/1983 | Gits | 277/373 |
| 4,639,159 A | * | 1/1987 | Amrath | 277/636 |
| 4,669,739 A | * | 6/1987 | Riccitelli | 277/392 |
| 4,779,876 A | * | 10/1988 | Novosad | 277/397 |
| 4,815,747 A | * | 3/1989 | Wolford | 277/306 |
| 4,917,389 A | * | 4/1990 | Baker et al. | 277/372 |
| 4,936,593 A | * | 6/1990 | Finney | 277/391 |
| 5,123,660 A | * | 6/1992 | Dahlheimer et al. | 277/393 |
| 5,340,121 A | * | 8/1994 | Lewis et al. | 277/393 |
| 5,538,257 A | * | 7/1996 | Sandgren | 277/379 |
| 5,725,219 A | * | 3/1998 | Gilbert | 277/377 |
| 5,797,602 A | * | 8/1998 | Less | 277/372 |
| 6,062,815 A | * | 5/2000 | Holt et al. | 415/231 |
| 6,113,106 A | * | 9/2000 | Dahlheimer | 277/433 |
| 6,145,841 A | * | 11/2000 | Maeda | 277/358 |
| 6,338,489 B1 | * | 1/2002 | Nakano | 277/385 |

FOREIGN PATENT DOCUMENTS

| | | | | |
|---|---|---|---|---|
| DE | 19846153 C1 | 4/2000 | | |
| JP | 60208670 A | * | 10/1985 | F16J/15/34 |

* cited by examiner

Primary Examiner—Robert J. Sandy
Assistant Examiner—Thomas Ho

(57) ABSTRACT

A seal head assembly includes a case. A ferrule is seated against the case. A spring is seated at one end against the ferrule. A spring seat receives a second end of the spring. The retainer ring has a band and a plurality of tabs, wherein the band engages the spring seat. A metal bellows has a first end in contact with the case and a second end having a contact surface for the tabs of the retainer ring. A seal washer has an annular groove, wherein the seal washer is received in the second end of the metal bellows. A seal is received in the annular groove of the seal washer.

13 Claims, 7 Drawing Sheets

BELLOWS FACE SEAL ASSEMBLY

CROSS REFERENCE TO RELATED APPLICATION

This claims the benefit of United States provisional patent application identified as Application No. 60/292,239, filed May 18, 2001.

BACKGROUND OF THE INVENTION

This invention relates in general to mechanical face seal assemblies. In particular, this invention relates to a seal head subassembly for use with a seal seat subassembly for a mechanical face seal.

A mechanical face seal assembly provides a fluid seal between a housing member and a shaft, one of which is rotating with respect to the other. Typically, the housing member is stationary and the shaft is rotating. The seal assembly prevents fluid loss between the shaft and the housing. One example of a mechanical face seal is disclosed in U.S. Pat. No. 5,676,382.

Conventional metal bellows seal assemblies have included designs which required complex fixtures and operations to crimp elements together. Furthermore, conventional designs have required machining to a seal ring to correct distortions that can occur in a crimping process. Other elements of such designs required bonding to retain elements together. Also, heat was retained in convention bellows seal assemblies that encapsulated and insulated seal rings. Such heat can cause distortions and possible leaks.

SUMMARY OF THE INVENTION

The present invention includes an improved mechanical face seal. The mechanical face seal includes a seal head subassembly and a seal seat subassembly. The seal head subassembly includes a direct drive mechanism between components of the subassembly to prevent relative rotation between mating elements. The seal head subassembly also avoids distortion of a seal ring during an assembly process, thus eliminating the need to machining. Furthermore, the seal head assembly exposes a substantial amount of the seal ring, so that heat can be dissipated without causing distortion to a seal ring.

In a preferred embodiment, a seal head assembly includes a case. A ferrule is seated against the case. A spring is seated at one end against the ferrule. A spring seat receives a second end of the spring. The retainer ring has a band and a plurality of tabs, wherein the band engages the spring seat. A metal bellows has a first end in contact with the case and a second end having a contact surface for the tabs of the retainer ring. A seal washer has an annular groove, wherein the seal washer is received in the second end of the metal bellows. A seal is received in the annular groove of the seal washer.

DETAILED DESCRIPTION OF THE INVENTION

A metal bellows seal head subassembly is indicated generally at 100 in FIGS. 1–3 and 25. A seal seat subassembly is indicated generally at 200 in FIG. 25, and is shown mated with the seal head assembly 100.

Figure 1:
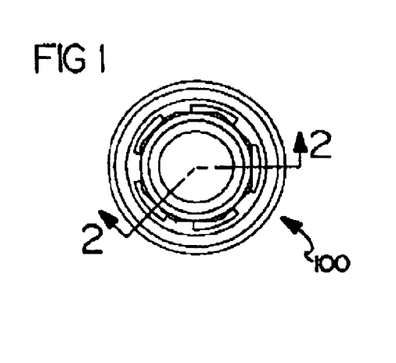
FIG. 1 is a top view of a metal bellows seal assembly according to this invention.
Figure 2:
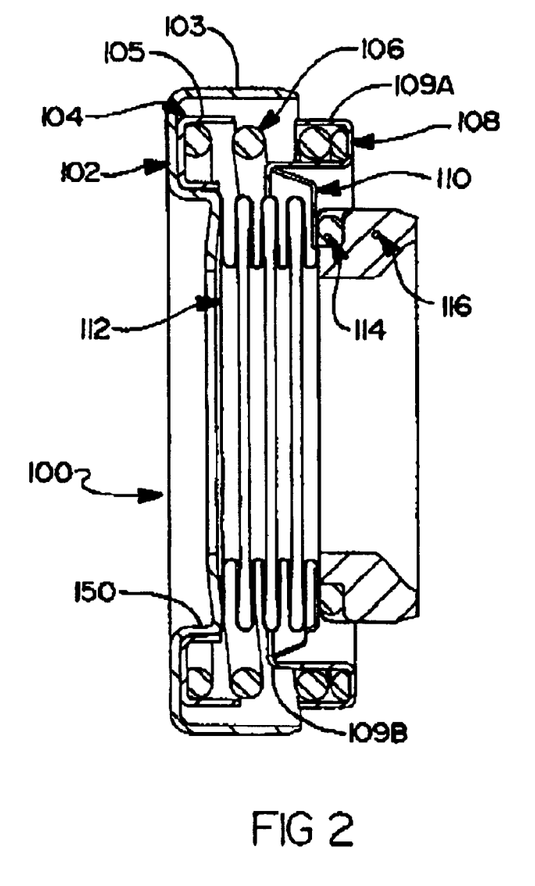
FIG. 2 is an enlarged sectional view taken along line 2—2 of FIG. 1.
Figure 3:
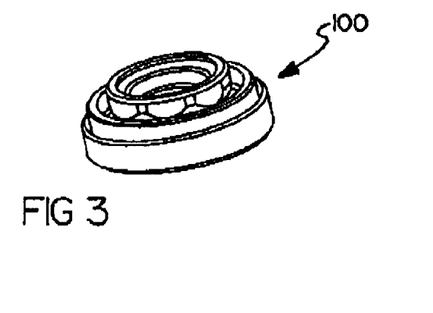
FIG. 3 is a perspective view of the metal bellows seal assembly of FIG. 1.
Figure 4:
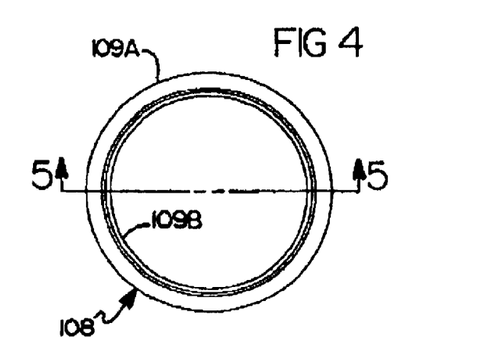
FIG. 4 is a top view of a spring seat removed from the metal bellows seal assembly of FIG. 1 for clarity of illustration.
Figure 5:
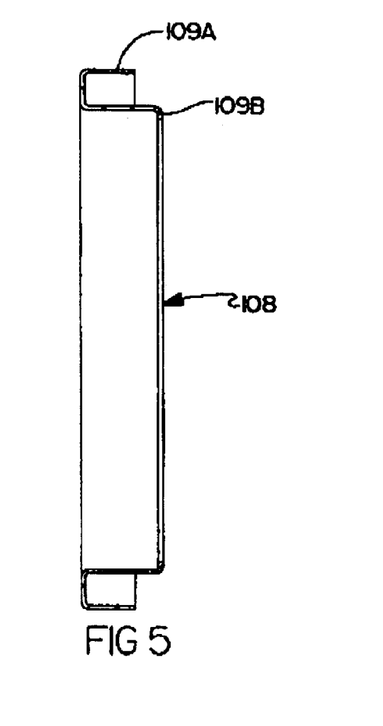
FIG. 5 is an enlarged sectional view taken along line 5—5 of FIG. 4.
Figure 6:
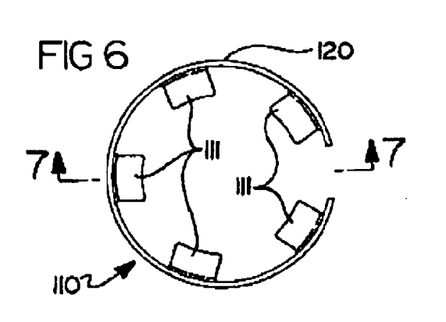
FIG. 6 is a top view of a retainer ring removed from the metal bellows seal assembly of FIG. 1 for clarity of illustration.
Figure 7:
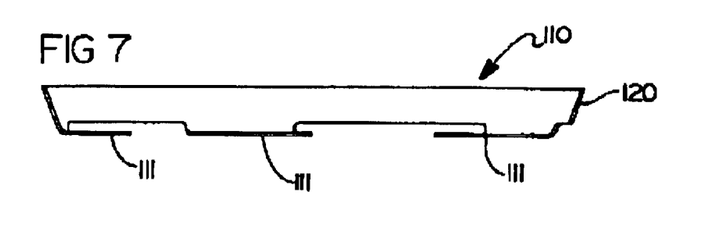
FIG. 7 is a sectional view taken along line 7—7 of FIG. 6.
Figure 8:
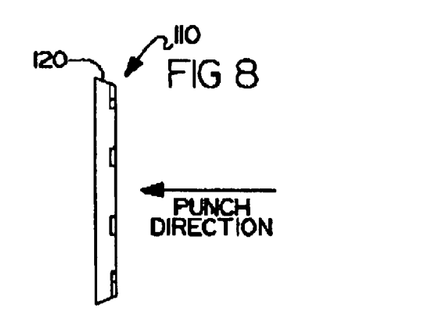
FIG. 8 is a side view of the retainer ring of FIG. 6.
Figure 9:
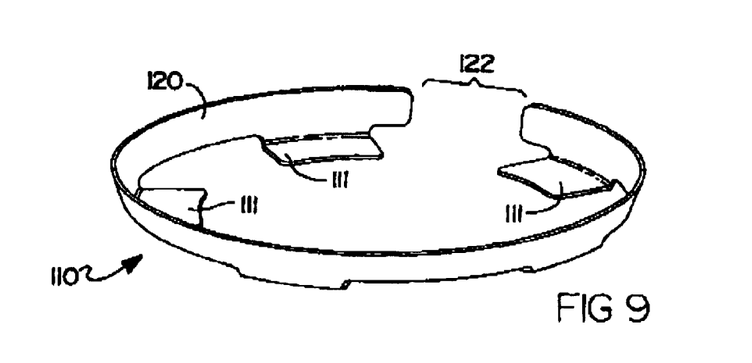
FIG. 9 is a perspective view of the retainer ring of FIG. 6.
Figures 10, 11, 12, 13:
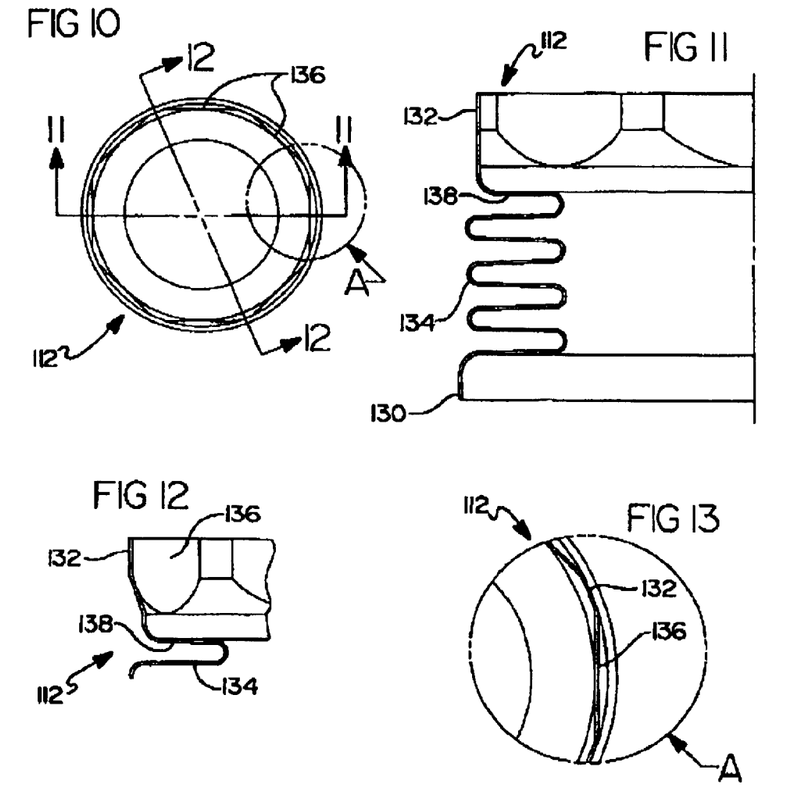
FIG. 10 is a top view of a metal bellows removed from the metal bellows seal assembly of FIG. 1 for clarity of illustration.
FIG. 11 is a sectional view taken along line 11—11 of FIG. 10.
FIG. 12 is a sectional view taken along line 12—12 of FIG. 10.
FIG. 13 is a greatly enlarged view of a portion of the retainer ring of FIG. 10 contained in circle A.
Figure 14:
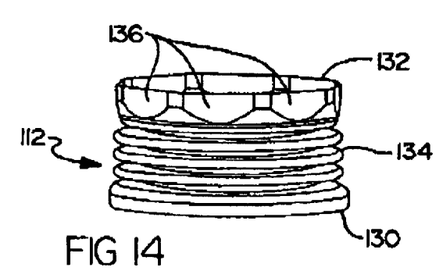
FIG. 14 is a perspective view of the retainer ring of FIG. 10.
Figure 15:
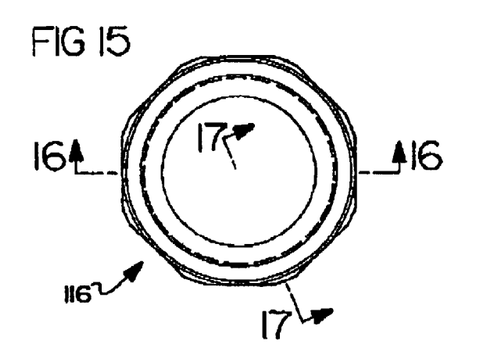
FIG. 15 is a top view of a seal ring from the metal bellows seal assembly of FIG. 1 for clarity of illustration.
Figure 16:
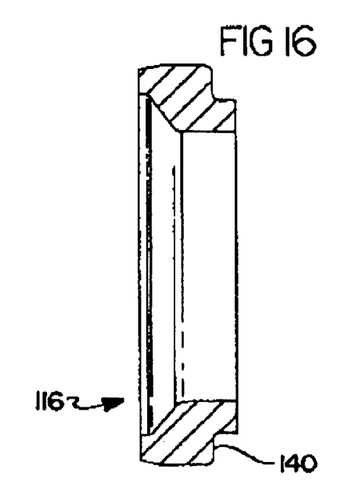
FIG. 16 is a sectional view taken along line 16—16 of FIG. 15.
Figure 17:
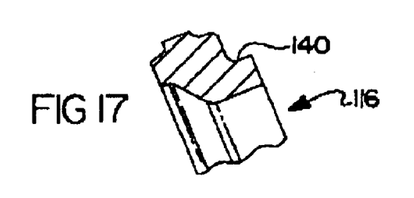
FIG. 17 is a sectional view taken along line 17—17 of FIG. 15.
Figure 18:
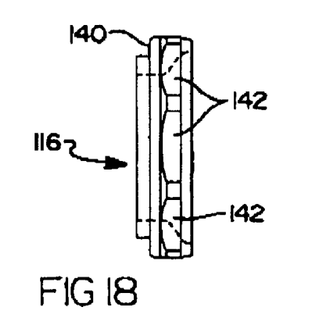
FIG. 18 is a side view of the seal ring of FIG. 15.
Figure 19:
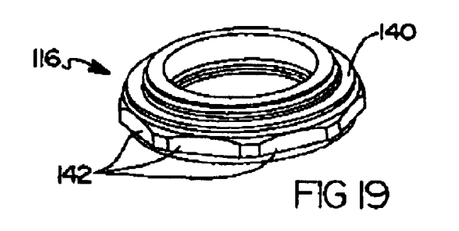
FIG. 19 is a perspective view of the seal ring of FIG. 15.
Figure 20:
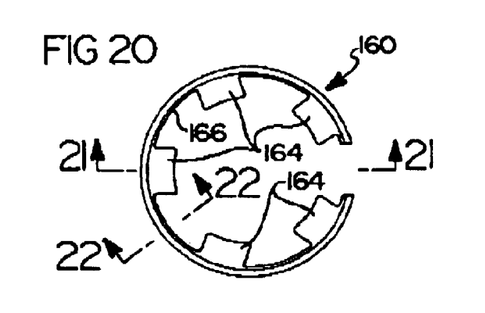
FIG. 20 is a top view of a second embodiment of a retainer ring that can be used with the metal bellows seal assembly of FIG. 1 for clarity of illustration.
Figure 21:
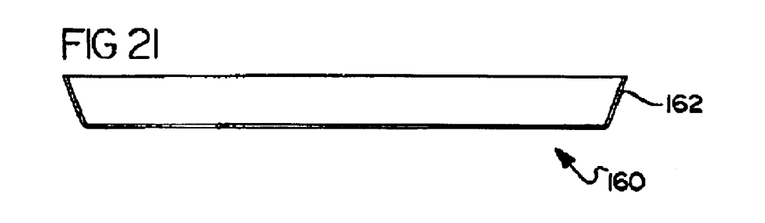
FIG. 21 is a sectional view taken along line 21—21 of FIG. 20.
Figure 22:
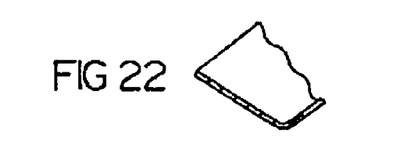
FIG. 22 is sectional view taken along line 22 of FIG. 20.
Figure 23:
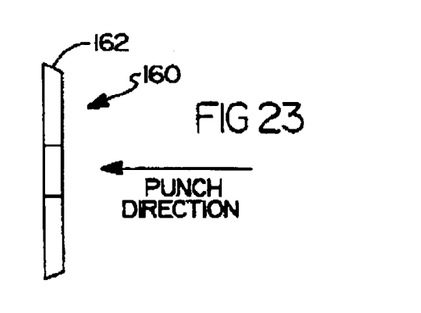
FIG. 23 is a side view of the retainer ring of FIG. 20.
Figure 24:
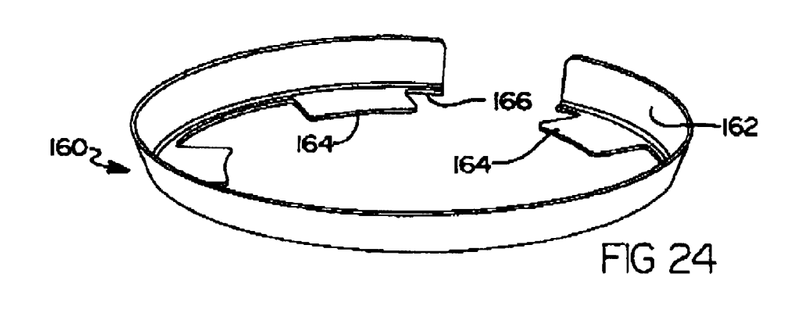
FIG. 24 is a perspective view of the retainer ring of FIG. 20.

The subassembly 100 includes a case 102, a ferrule 104, a spring 106, a spring seat 108, a retainer (or retaining) ring 110, a metal bellows 112, a seal (illustrated as an O-ring) 114, and a seal ring (or seal washer) 116.

The case 102 is preferably formed as an annular ring member having an outer collar 103 that encircles other elements of the subassembly 100. The ferrule 104 is preferably formed as an annular ring member and is placed against the case 102. An outer collar 105 is formed on the ferrule 104. One end of the spring 106 is placed against the ferrule 104 inside of the collar 105. The spring 106 is axially compressible and preferably is formed as a coil spring.

As illustrated in FIGS. 2–5, the spring seat 108 is preferably formed as an annular tubular member having an outer collar 109A. An opposite end of the spring 106 is placed against the spring seat 108 inside of the collar 109A. The spring seat 108 also includes an inwardly radiating flange 109B that seats the retainer ring 110 as described below.

As illustrated best in FIGS. 6–9, the retainer ring 110 is preferably formed as a non-continuous annular member having a plurality of inwardly radiating tabs 111 and an annular band 120. A gap 122 is fanned between two ends of the band 120. Preferably, the band 120 is tapered or conical, so that a diameter at one end is smaller than a diameter at an opposite end. Preferably, the tabs 111 are equally spaced and radiate inwardly from the end of the band with a smaller diameter. To facilitate radial expansion and compression described below, the retainer ring 110 is formed from a resilient material and includes a gap 122. The retainer ring 110 is placed against the spring seat 108 so that the band 120 contacts and is seated by the flange 109B of the spring seat 108. The retainer ring 110 can be formed by any desired means, including the use of a punch press.

The metal bellows 112 is illustrated best in FIGS. 10–14. The metals bellows 112 includes a first end 130 that engages the case 102 and the ferrule 104. A second end 132 of the metal bellows 112 receives the seal 114 and seal ring 116. A bellows section 134 is formed between the first end 130 and the second end 132. A plurality of flats 136 is formed in a radial wall or cuff at the second end 132. A contact surface 138 is provided between the bellows section 134 and the cuff of the second end 132. The tabs 111 of the retainer ring 110 are placed against the contact surface 138.

The seal ring 116 is illustrated best in FIGS. 15–19. The seal ring 116 is preferably formed an annular ring member having an annular outer groove 140 that receives the seal 114. A series of flats 142 are formed in the outer radial wall of the seal ring 166 in a manner to correspond to the flats 136 of the metal bellows 112.

A force from the spring 106 is transmitted to the spring seat 108 and through the retainer ring 110 so that the tabs 111 are biased against the contact surface 138 of the metals bellows 112. This force is transmitted through the metals bellows 112 to compress the seal 114 to provide a leak tight seal between the radial wall of the second end 132 and the seal washer 116.

The flats 136 formed in the end cuff of the metal bellows 112 slide over and engage the corresponding flats 142 formed on the outer wall of the seal washer 116. These engaging flats 136 and 142 provide a direct drive mechanism between the metal bellows 112 and the seal washer 116 that prevents relative rotation between the two elements.

The first end 130 of the metal bellows 112 has a conventional tubular cuff that can be press-fit around an annular shoulder 150 (see FIG. 1) of the case 102 by the ferrule 104. This press fit provides sealing and positive drive between the metal bellows 112 and case 102.

A second embodiment of a retainer ring is indicated generally at 160 in FIGS. 20–24. The retainer ring 160 includes a band 162, a plurality of tabs 164, and an inner rim 166 provided at one end of the band 162 from which the tabs 164 project. The retainer ring 160 can be formed by any desired means. The retainer ring 160 can be substituted from retainer ring 110 in the subassembly 100.

A preferred method of assembling the seal head subassembly 100 is described below. First, the tubular cuff of the first end 130 of the metals bellows 112 is press-fit around the shoulder 150 of the case 102 with the ferrule 104. In other words, the cuff is trapped between the ferrule 104 and the case 102.

Second, the retainer ring 110 is expanded with retainer ring pliers (not illustrated) so that the inwardly radiating tabs 111 on both sides of the gap 122 are spread apart enough to pass over the second end 132 of the metal bellows 112 and rest at a root of the bellows section 134 to engage the contact surface 138. When the retainer ring 110 is positioned concentrically, the expanded retainer ring 110 is released, allowing the retainer ring 110 and its tabs 111 to contract inwardly to their original positions.

Third, the compression spring 106 is positioned down around the metal bellows 112 and the retainer ring 110 until it rests against the ferrule 104. The spring seat 108 is fitted down onto the spring 106 until the outer collar 109A rests against the spring 106. Pushing axially downwardly on the spring seat 108 causes the spring 106 to compress and the inwardly radiating flange 109B of the spring seat 108 to pass over the small end and down the outside of the tapered retainer ring 110 until the inner diameter of the spring seat flange 109B engages the large diameter of the band 120 of the retainer ring 110. Continued axial compression of the spring seat 108 and spring 106 causes the inwardly radiating tabs 111 of the retainer ring 110 bearing against a convolution of the bellows section 134 to compress the remainder of the convolutions until they contact one another through their outer and inner convolution radii. In this state, the metal bellows 112 has become "solid" and resists further compression.

Continued axial compression of the spring seat 108 and spring 106 causes the retainer ring 110 to compress inwardly as the flange 109B of the spring seat 108 is pressed down the tapered length of the band 120. Eventually the flange 109B of the spring seat 108 passes over the inwardly compressed larger end of the tapered band 120, allowing the retainer ring 110 to spring outwardly to its original position. In this position, the larger end of band 120 provides a slip fit with the flange 109B, thus allowing the metal bellows 112 to spring back to its original length, carrying the retainer ring 110 with it.

Lowering the force against the spring seat 108 allows the spring 106 to decompress and move the spring seat 108 axially up and back over the retainer ring 110 until the flange 109B of the spring seat 108 catches against a forward edge of the band 120 of the retainer ring 110. A further reduction in force on spring 106 allows the tabs 111 of the retainer ring 110 to move from the rear wall of the convolution and press against the contact surface 138.

The force applied to the spring 108 during assembly is totally removed and the spring 106 and metal bellows 112 expand axially until the tension force of the metal bellows 112 equals the remaining force of the spring 106. Next, the rubber seal 114 and seal washer 116 are installed down into the tubular cuff of the metal bellows 112. The flats 136 on the cuff are aligned with the flats 142 on the outer wall of the seal washer 116. This completes the assembly of the seal head subassembly or stationary portion 100 of the unitized mechanical face seal assembly 200.

Figure 25:
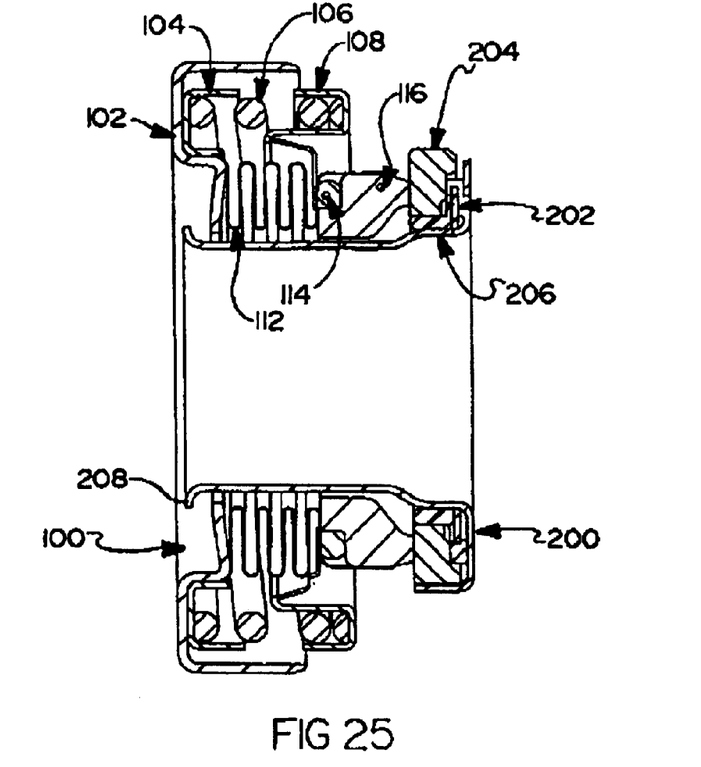
FIG. 25 is a sectional view of the metal bellows seal assembly of FIG. 1 combined with a seal seat subassembly.

As illustrated in FIG. 25, the rotating seal seat subassembly 200, consisting of a cup gasket 202, a mating ring (or rubber grommet) 204, and a sleeve 206, is positioned down through the interior of the seal washer 116, metal bellows 112, and case 102 of the metal bellows seal head subassembly 100.

The subassembly 200 is inserted into subassembly 100 until a tubular end of the sleeve 206 extends beyond the case 102. At this point, the tubular end 208 of the sleeve 206 is flared out to a larger diameter than the opening in the case 102 to create a unitized assembly of the seal head subassembly 100 and the seal seat subassembly 200 into a complete mechanical face seal assembly.

Additional details of the seal seat subassembly 200 are found in U.S. Pat. No. 5,676,382, issued Oct. 14, 1997, and assigned to the same assignee as this invention. U.S. Pat. No. 5,676,382 is hereby incorporated by reference.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seal head assembly comprising:
   a case;
   a ferrule seated against the case;
   a spring seated at one end against the ferrule;
   a spring seat receiving a second end of the spring;
   a retainer ring having a band and a plurality of tabs, wherein the band engages the spring seat,
   a metal bellows having a first end into contact with the case and a second end having a contact surface for the tabs of the retainer ring;
   a seal washer having an annular groove, wherein the seal washer is received in the second end of the metal bellows; and
   a seal received in the annular groove of the seal washer.

2. The seal head assembly specified in claim 1 wherein the retainer ring includes a gap formed band to permit expansion and contraction of the retainer ring.

3. The seal head assembly specified in claim 1 wherein the band of the retainer ring is tapered.

4. The seal head assembly specified in claim 1 wherein the spring seat includes an inwardly radiating flange that seats the annular band.

5. The seal head assembly specified in claim 1 wherein the metal bellows includes a plurality of flats mated with a plurality of flats on seal washer to provide a direct drive between the metal bellows and the seal washer.

6. The seal head assembly specified in claim 1 wherein the seal is an O-ring.

7. A seal assembly comprising:
   a seal head subassembly including
      a case;
      a ferrule seated against the case;
      a spring seated at one end against the ferrule;
      a spring seat receiving a second end of the spring;
      a retainer ring having a band and a plurality of tabs, wherein the band engages the spring seat,
      a metal bellows having a first end into contact with the case and a second end having a contact surface for the tabs of the retainer ring;
      a seal washer having an annular groove, wherein the seal washer is received in the second end of the metal bellows; and
      a seal received in the annular groove of the seal washer; and
   a seal seat subassembly pressed into the seal head subassembly.

8. The seal assembly specified in claim 7 wherein the seal seat subassembly includes a cup gasket, a mating ring, and a sleeve.

9. The seal assembly specified in claim 7 wherein the retainer ring includes a gap formed band to permit expansion and contraction of the retainer ring.

10. The seal assembly specified in claim 7 wherein the band of the retainer ring is tapered.

11. The seal assembly specified in claim 7 wherein the spring seat includes an inwardly radiating flange that seats the annular band.

12. The seal head assembly specified in claim 7 wherein the metal bellows includes a plurality of flats mated with a plurality of flats on seal washer to provide a direct drive between the metal bellows and the seal washer.

13. The seal assembly specified in claim 7 wherein the seal is an O-ring.

\* \* \* \* \*